United States Patent [19]
Chieco et al.

[11] Patent Number: 5,912,928
[45] Date of Patent: Jun. 15, 1999

[54] HIGH SPEED SERIAL DATA TRANSMISSION ENCODER

[75] Inventors: Leonard R. Chieco, Hopewell Junction; Louis T. Fasano; Keith W. Heilmann, both of Poughkeepsie; Michael A. Sorna, Hopewell Junction, all of N.Y.

[73] Assignee: International Business Machines Corporation, Armonk, N.Y.

[21] Appl. No.: 08/884,117

[22] Filed: Jun. 27, 1997

[51] Int. Cl.⁶ .............................. H04L 27/20; H04L 7/02; H03M 7/12

[52] U.S. Cl. ........................ 375/308; 375/359; 375/361; 341/70

[58] Field of Search ..................................... 375/308, 359, 375/361, 354, 334, 293; 341/70, 100, 101; 370/366

[56] References Cited

U.S. PATENT DOCUMENTS

| | | | |
|---|---|---|---|
| 3,962,647 | 6/1976 | Richman | 341/70 |
| 4,544,962 | 10/1985 | Kato et al. | 360/40 |
| 4,592,072 | 5/1986 | Stewart | 375/382 |
| 4,603,322 | 7/1986 | Blair | 341/70 |
| 4,746,898 | 5/1988 | Loeppert | 341/70 |
| 4,752,942 | 6/1988 | Iwakami | 375/361 |
| 4,799,239 | 1/1989 | Pearlman et al. | 375/334 |
| 4,928,289 | 5/1990 | Dingeman | 375/293 |

*Primary Examiner*—Chi H. Pham
*Assistant Examiner*—Khai Tran
*Attorney, Agent, or Firm*—Whitham, Curtis & Whitham; H Daniel Schnurmann

[57] ABSTRACT

A clock encoding circuit, e.g., for Manchester encoding, for high speed data transmission (IEEE 1394) and a circuit for controlling data and encoded clock transmission. The clock encoding circuit includes two parallel to serial shift registers, a DATA register and a STROBE register, receiving data in parallel and shifted out at 100 MHz, 200 MHz or 400 MHz. The STROBE register receives every other bit of the data inverted. When both registers are clocked at the data transmission rate, data is shifted out of DATA register and the transmission clock is encoded in STROBE, shifted out of the STROBE register. Bit inversion may be with invertors receiving data as it is passed to the DATA register, or alternatively, after it is loaded into the DATA register. The circuit for controlling DATA and STROBE transmission includes the clock encoding circuit, a frequency matching register array and a loopback shift register. A control word is loaded into the loopback register and loops through the loopback register at the transmission rate, triggering data transfers from the frequency matching register array to the DATA and STROBE registers. All or part of the DATA and STROBE register contents is transmitted depending on the transmission rate.

13 Claims, 3 Drawing Sheets

HIGH SPEED SERIAL DATA TRANSMISSION ENCODER

BACKGROUND OF THE INVENTION

1. Field of the Invention

The present invention generally relates to high speed data transmission and, more particularly to encoding data for high speed synchronous data transmission.

2. Background Description

As computer performance and computer peripheral performance improve, computer to computer and computer to peripheral communications become more complicated. In the fall of 1995, the IEEE adopted the 1394 High Speed Serial Bus standard, which defines operating points at 100 MegaHertz (MHZ), 200 MHz and 400 MHz. The IEEE 1394 standard is rapidly being accepted as the standard for high speed data communications.

To achieve high speed data transmission at these rates, data is transmitted non-return-to-zero (NRZ) and the transmission clock is encoded into a second NRZ serial signal, STROBE. STROBE is defined by:

$$STROBE_{new} = DATA_{new} \oplus DATA_{old} \oplus \overline{STROBE_{old}},$$

wherein the subscript "old" indicates the current value of DATA or STROBE and "new" indicates the next, subsequent value. This encoding scheme is known as the Manchester encoding scheme.

Using the Manchester encoding scheme STROBE and Data are transmitted, serially, and the transmission clock is extracted at the receiving end from STROBE and DATA.

FIG. 1 is a schematic diagram provided in the IEEE 1394 specification of a prior art circuit 100 for generating STROBE and DATA. The circuit includes two edge triggered D-type latches 102, 104 and two exclusive ORs (EXORs) 106, 108. $DATA_{old}$ is latched in latch 102 and $STROBE_{old}$ is latched in latch 104. $DATA_{new}$ is provided to EXOR 106 and the D input to latch 102. $DATA_{new}$ is EXORed with $DATA_{old}$ in EXOR 104 and the result is provided to EXOR 108. The result from EXOR 106 is then EXORed with $\overline{STROBE_{old}}$ to generate the D input ($STROBE_{new}$) to latch 104. On each rising clock edge, the values of $DATA_{new}$ and $STROBE_{new}$ are latched into latches 102 and 104 as $DATA_{old}$ and $STROBE_{old}$ with a new value for $DATA_{new}$ being supplied.

While this circuit is adequate for generating STROBE at 100 MHz or 200 MHz, logic delays inherent in current logic families make a 400 MHz STROBE difficult to implement. Further, controlling STROBE and DATA transmission requires complicated control logic. Thus, there is a need for a circuit for generating STROBE at a 400 MHz data rate that is less sensitive to logic delays.

SUMMARY OF THE INVENTION

It is therefore a purpose of the present invention to reduce the stage delay between DATA and STROBE.

It is another purpose of the present invention to simplify DATA and STROBE generation control logic.

The present invention is a clock encoding circuit for high speed data transmission, e.g., for Manchester encoding, and a circuit for controlling transmitting data and the encoded clock. The clock encoding circuit includes two parallel to serial shift registers receiving parallel DATA and shifting at the data transmission rate. One of the registers receives every other bit of the data inverted. When both registers are clocked at the data transmission rate, DATA is shifted out of the register with uninverted bits, and the transmission clock is encoded in STROBE, which is shifted out of the serial output of the other register. Bit inversion may be with invertors receiving data as it is passed in parallel to both registers, or alternatively, after it is loaded into the one (DATA) register.

The circuit for controlling the data and encoded clock transmission includes the above preferred clock encoding circuit, a frequency matching register array and a loopback shift register.

The loopback register loops through a control word at the data transmission frequency of 100 MHz, 200 MHz or 400 MHz. In the preferred embodiment, one bit of the looping control word selects whether data is serially transferred out of the two parallel to serial registers or data is loaded into the two parallel to serial registers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
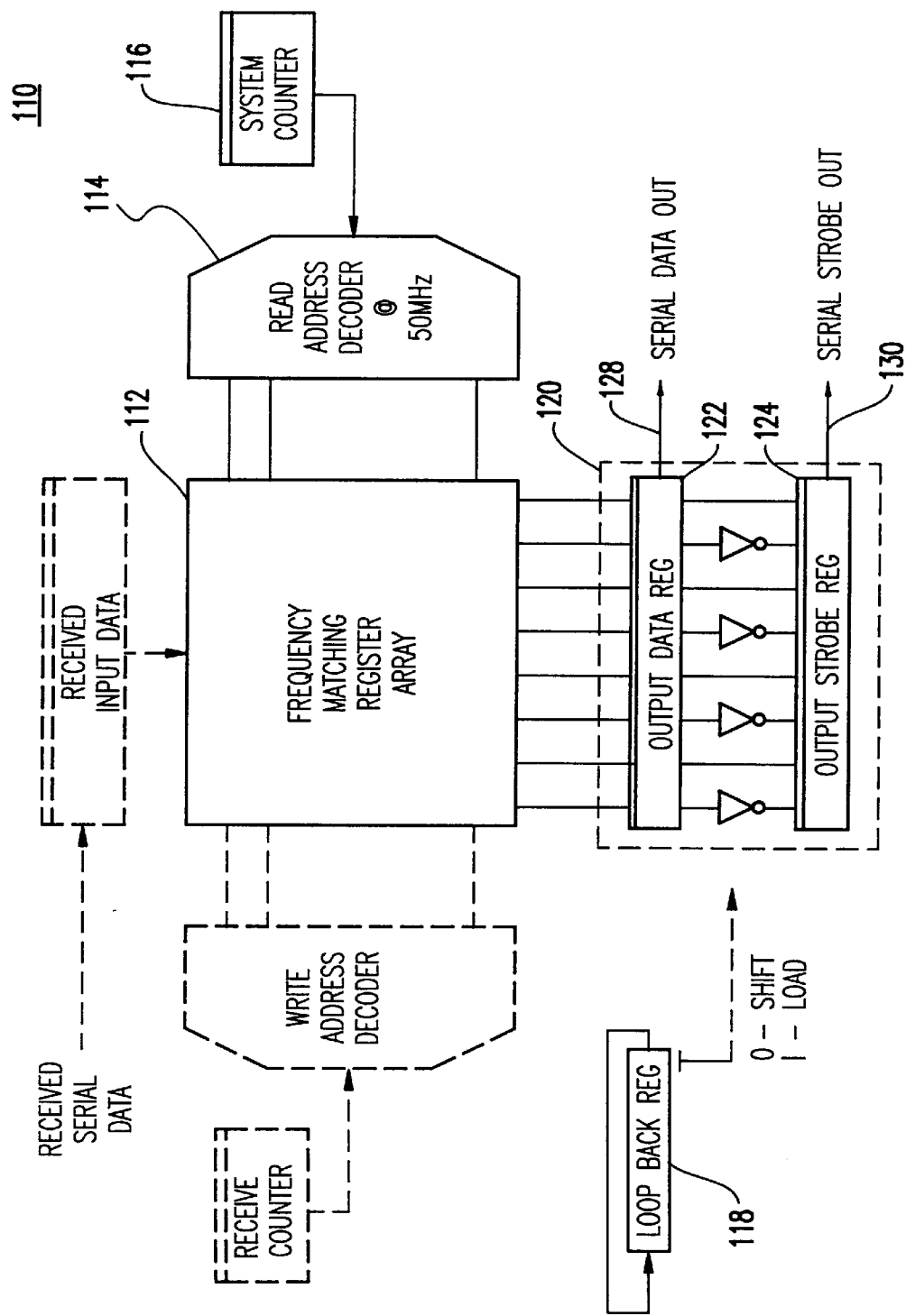
FIG. 2 is a block diagram representing a preferred embodiment circuit for controlling data and encoded clock transmission for an IEEE 1394 compatible Device.

FIG. 2 is a block diagram a circuit for controlling data and encoded clock transmission for an IEEE 1394 compatible Integrated Circuit (IC) Chip 110 according to the preferred embodiment of the present invention. A STROBE signal and a DATA signal are received by the chip 110, which extracts the encoded clock therefrom. The serial data is clocked by the extracted clock into a Frequency Matching Register Array 112.

The Frequency Matching Register Array 112 is a randomly addressable array of registers. Read Address Decoder 114 provides address selection to the Frequency Matching Register Array 112. A count from System Counter 116, counting at the 50 MHz chip clock rate, is provided as an address to Read Address Decoder 114.

A Loopback Control Register 118 synchronizes loading output data into an Output Register 120 with the 50 MHz system clock. Data may be provided to the Output Register 120 from the Frequency Matching Register Array 112 or, from elsewhere in the chip. In the preferred embodiment, as described hereinbelow, the state of one bit of Loopback Register 118 selects either parallel loading of Output Register 120 or, serially unloading the Output Register 120, i.e., shifting DATA and STROBE out at the data transmission rate.

The inventors have discovered, through recursive data analysis of the 1394 $STROBE_{new}$ definition, that STROBE may be derived by inverting alternating DATA bits. In other words, STROBE may be generated by inverting, for example, odd DATA bits and keeping even DATA bits uninverted. Therefore, instead of generating STROBE serially as is done by the prior art circuit 100, STROBE may be treated as pseudo data and modular values, e.g., bytes or words, may be generated from data as it becomes available. After generating the pseudo data, both DATA and the pseudo data (STROBE) may be clocked off chip serially.

Figure 1:
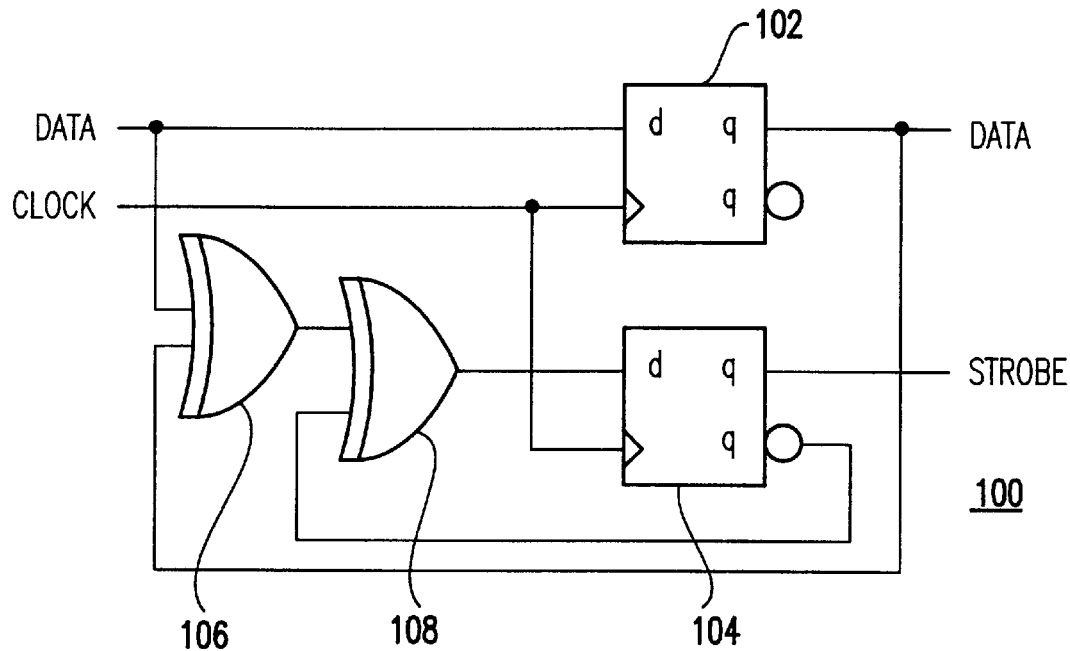
FIG. 1 is a schematic diagram of a prior art circuit for generating STROBE and Data as provided in the IEEE 1394 specification.
Figure 3:
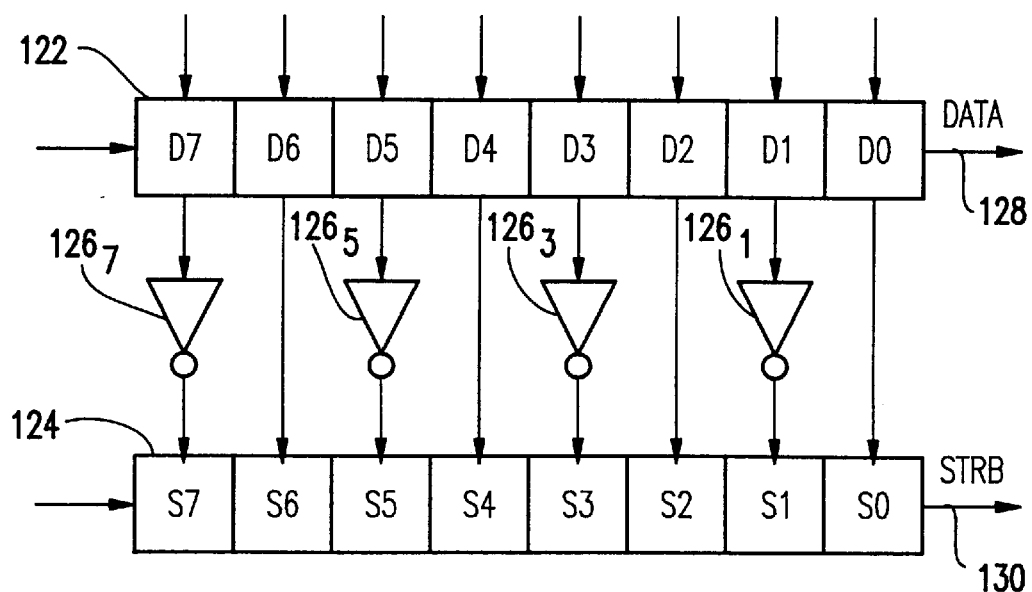
FIG. 3 is a schematic representation of a preferred embodiment STROBE generation circuit.

FIG. 3 is a schematic representation of a preferred embodiment Output Register 120. The preferred embodiment Output Register 120 includes two n bit (e.g., eight bit) parallel to serial registers 122, 124 and n/2 (e.g., four) invertors, $126_1$, $126_3$, $126_5$ and $126_7$. The outputs of invertors $126_1$, $126_3$, $126_5$ and $126_7$ are connected to the odd parallel inputs of STROBE register 124, inverting odd data bits.

Data is passed directly to and latched into DATA register 122. Preferably, even data bits are passed directly to the STROBE register 124 and odd data bits are passed directly to the invertors $126_1$, $126_3$, $126_5$, and $126_7$. Thus uninverted even and inverted odd data bits are latched into the STROBE register 124. Once both registers are latched, both DATA and STROBE are shifted or gated out, serially, on serial outputs 128 and 130, respectively.

In an alternate embodiment, DATA register 122 also may include parallel outputs and be capable of passing data in parallel. In this embodiment, the even outputs of the DATA register 122 pass in parallel to the STROBE register 124 and odd outputs of DATA register 122 pass in parallel to the invertors $126_1$, $126_3$, $126_5$, and $126_7$. Optionally, if the DATA register 122 includes inverting outputs, invertors $126_1$, $126_3$, $126_5$, and $126_7$ may be omitted and the inverted odd outputs passed directly. After the inputs to both registers 122, 124 are stable, the registers 122, 124 are latched and, as with the preferred embodiment, both DATA and STROBE are shifted or gated out, serially, on serial outputs 128 and 130, respectively.

At a 400 MHz data transmission, which is eight times as fast as the 50 MHz chip clock, all eight DATA bits and all eight STROBE bits (in the present example) are serially transmitted from the output Register 120. However, at slower transmission rates, below 400 MHz, only a subset of each parallel block is transmitted. Thus, at 200 MHZ, half of each register is transmitted and at 100 MHz a quarter of each register is transmitted. This reduced register content transmission is necessary because, regardless of the transmission rate, data is loaded into the Output Register 120 at 50 MHz.

Figure 4:
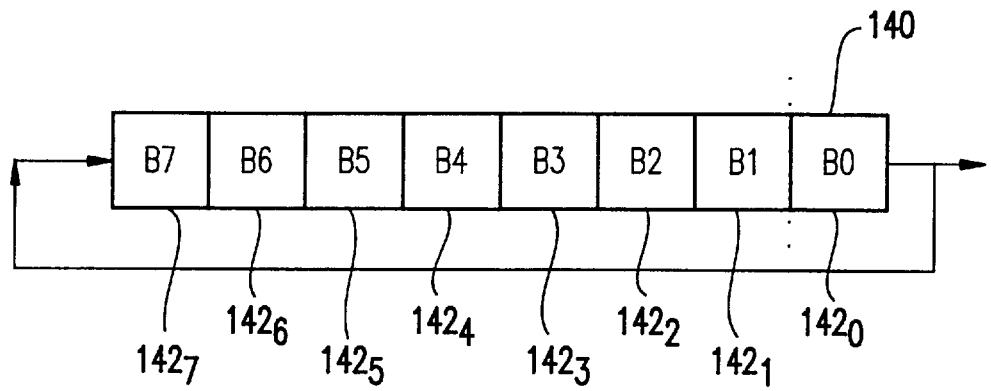
FIG. 4 schematically represents the preferred embodiment Shift Control Circuit.

FIG. 4 schematically represents the preferred embodiment Loopback Control Register 140. The Loopback Control Register 140 is essentially a one bit by eight shift register. The Shift Control Circuit 140 has one shift position $142_7$–$142_0$ corresponding to each bit of DATA and STROBE registers 122, 124.

Upon initiation of a data transfer, a control word corresponding to the transfer clock rate is loaded into the Loopback Control Register 140. The Loopback Control Register 140 is then clocked at the transfer rate, with the control word bits looping around the Loopback Control Register 140. At the appropriate start of a shift period, a control word bit is shifted into position that triggers transferring new data into DATA register 122 and STROBE register 124 from the Frequency Matching Register Array 112.

Figure 5A:
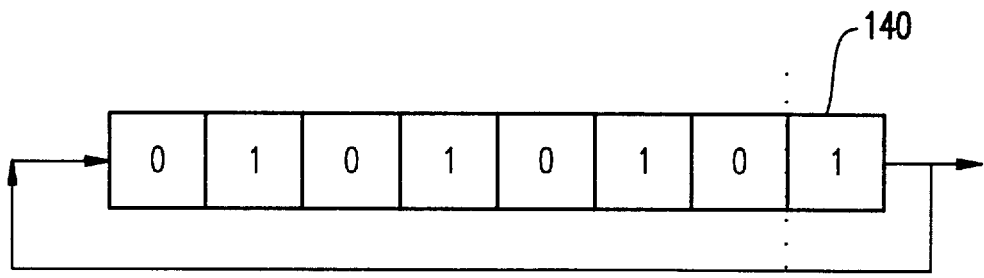
FIGS. 5A–C each represent one of three possibilities for the Shift Control Circuit of FIG. 4.
Figure 5B:
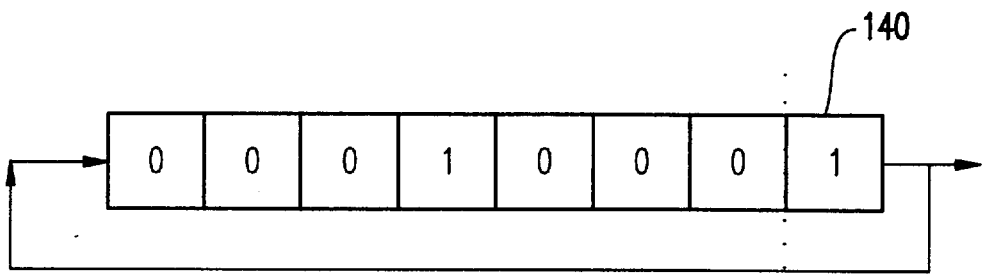
Figure 5C:
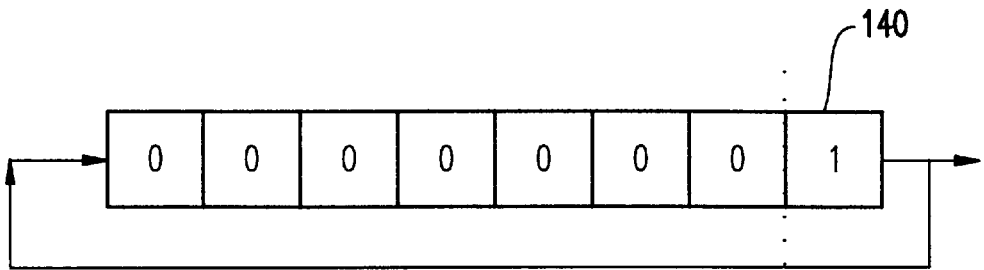

FIGS. 5A–C each represent one of three possibilities for the Shift Control Circuit 140 for the present example. The IC Chip clock is 50 MHz, shifting occurs every second 100 MHz cycle in FIG. 5A, every fourth 200 MHz cycle in FIG. 5B and every eighth 400 MHz cycle in FIG. 5C.

Thus, in FIG. 5A, for 100 MHz data rate, the Shift Control Circuit 140 is loaded with alternating ones and zeros, to trigger reloading the DATA register 132 and STROBE register 134 every other cycle. In FIG. 5B, for 200 MHz data rate, the Shift Control Circuit 140 is loaded with a one for every fourth bit, which triggers a reload every fourth cycle. In FIG. 5C, for 400 MHz data rate, the Shift Control Circuit 140 is loaded with a single one and the remaining positions as zero, to trigger a reload every eighth cycle.

While the invention has been described in terms of preferred embodiments, those skilled in the art will recognize that the invention can be practiced with modification within the spirit and scope of the appended claims.

We claim:

1. A clock encoding circuit, for high speed data transmission such as for Manchester encoding, said clock encoding circuit comprising:

a first register, said first register being a parallel to serial shift register receiving data in parallel and being clocked at a data transmission rate, said data being shifted and transmitted at said data transmission rate as a serial data signal; and a second register, said second register being a parallel to serial shift register clocked at said data transmission rate, said second register receiving altered data in parallel, every other bit of said altered data being inverted from data received by said first register, said altered data being clocked and shifted and transmitted at said data transmission rate as a strobe signal, whereby signal delay between said data received by said first register and said altered data received by said second register is minimized.

2. The clock encoding circuit of claim 1 further comprising a plurality of invertors, each said every other data bit being inverted by one of said plurality of invertors to provide said altered data.

3. The clock encoding circuit of claim 2 wherein the plurality of invertors are connected between parallel inputs of said first register and parallel inputs of said second register.

4. The clock encoding circuit of claim 2 wherein the plurality of invertors are connected between parallel outputs of said first register and parallel inputs of said second register.

5. An Integrated Circuit (IC) chip including a data transmission circuit, said data transmission circuit including the clock encoding circuit of claim 1 and further comprising:

a frequency matching register array storing data to be passed to said clock encoding circuit for transmission; and, a loopback shift register controlling data transfers between said frequency matching register array and said clock encoding circuit.

6. An Integrated Circuit (IC) chip including a data transmission circuit comprising:

a clock encoding circuit encoding a transmission clock into data to generate a STROBE signal;

a frequency matching register array storing data to be passed to said clock encoding circuit for transmission; and, a loopback shift register controlling data transfers between said frequency matching register array and said clock encoding circuit, wherein the number transmitted of bits from each frequency matching register array location is determined by a control word shifted through said loop back shift register.

7. The Integrated Circuit (IC) chip of claim 6 wherein the clock encoding circuit comprises:

a first register, said first register being a parallel to serial shift register receiving data in parallel and being clocked at a data transmission rate, said data being shifted and transmitted at said data transmission rate as a serial data signal; and a second register, said second register being a parallel to serial shift register clocked at said data transmission rate, said second register receiving altered data in parallel, every other bit of said altered data being inverted from data received by said first register, said altered data being clocked and shifted and transmitted at said data transmission rate as a strobe signal.

8. The Integrated Circuit (IC) chip of claim 7 wherein the clock encoding circuit further comprises a plurality of invertors, each said every other data bit being inverted by one of said plurality of invertors to provide said altered data.

9. The Integrated Circuit (IC) chip of claim 8 wherein the plurality of invertors are connected between parallel inputs of said first register and parallel inputs of said second register.

10. The Integrated Circuit (IC) chip of claim 8 wherein the plurality of invertors are connected between parallel outputs of said first register and parallel inputs of said second register.

11. An Integrated Circuit (IC) chip including a Manchester encoding data transmission circuit comprising:

a frequency matching register array storing data to be transmitted;

a first parallel to serial shift register receiving data in parallel from said frequency matching register array and being clocked at a data transmission rate, said received data being shifted and transmitted at said data transmission rate as a serial data signal;

a second parallel to serial shift register clocked at said data transmission rate;

a plurality of invertors, every other bit of said received data being inverted by one of said plurality of invertors, said second parallel to serial shift register receiving altered data in parallel, said altered data being inverted data bits from said invertors and uninverted bits received by said first parallel to serial shift register, said altered data being shifted and transmitted at said data transmission rate as a strobe signal; and, a loopback shift register controlling data transfers between said frequency matching register array and said first and second parallel to serial registers, wherein the number of bits transmitted from each frequency matching register array location is determined by a control word being shifted through said loopback shift register.

12. The Integrated Circuit (IC) chip of claim 11 wherein the plurality of invertors are connected between parallel inputs of said first parallel to serial shift register and parallel inputs of said second parallel to serial shift register.

13. The Integrated Circuit (IC) chip of claim 11 wherein the plurality of invertors are connected between parallel outputs of said first parallel to serial shift register and parallel inputs of said second parallel to serial shift register.

* * * * *